United States Patent
Kim

(10) Patent No.: US 10,266,070 B2
(45) Date of Patent: Apr. 23, 2019

(54) VEHICLE MOTOR CONTROL SYSTEM AND METHOD

(71) Applicant: Hyundai Mobis Co., Ltd., Seoul (KR)

(72) Inventor: Yong Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 232 days.

(21) Appl. No.: 15/293,440

(22) Filed: Oct. 14, 2016

(65) Prior Publication Data

US 2017/0151947 A1   Jun. 1, 2017

(30) Foreign Application Priority Data

Nov. 26, 2015 (KR) .................. 10-2015-0166172

(51) Int. Cl.
*B60L 15/20* (2006.01)
*H02P 25/18* (2006.01)

(52) U.S. Cl.
CPC .......... *B60L 15/2045* (2013.01); *H02P 25/18* (2013.01); *B60L 2240/421* (2013.01); *B60L 2240/423* (2013.01); *B60L 2240/427* (2013.01); *B60L 2250/26* (2013.01); *Y02T 10/644* (2013.01); *Y02T 10/645* (2013.01); *Y02T 10/72* (2013.01); *Y02T 10/7283* (2013.01)

(58) Field of Classification Search
CPC ......... B60L 2240/427; B60L 2240/423; B60L 2240/421; B60L 2250/26; B60L 15/2045; H02P 29/00; Y02T 10/72; Y02T 10/645; Y02T 10/7283
See application file for complete search history.

(56) References Cited

U.S. PATENT DOCUMENTS

| | | | | |
|---|---|---|---|---|
| 4,549,121 A | * | 10/1985 | Gale | .................. B60L 11/1803 318/271 |
| 2010/0082191 A1 | * | 4/2010 | Seo | ......................... B60K 6/46 701/22 |
| 2011/0234139 A1 | | 9/2011 | Hsu | |
| 2013/0002184 A1 | * | 1/2013 | Bates | ....................... H02P 1/04 318/495 |
| 2016/0233811 A1 | * | 8/2016 | Sanada | ................. H02P 27/047 |

FOREIGN PATENT DOCUMENTS

| | | |
|---|---|---|
| KR | 10-2007-0017446 | 2/2007 |
| KR | 10-2011-0072461 | 6/2011 |
| KR | 10-2015-0063811 | 6/2015 |

\* cited by examiner

*Primary Examiner* — Rachid Bendidi
(74) *Attorney, Agent, or Firm* — H.C. Park & Associates, PLC

(57) ABSTRACT

A vehicle motor control system and method. The vehicle motor control system includes a measurement unit configured to measure a motor speed of a vehicle and a pressure applied to an accelerator pedal, a determination unit configured to compare the measured motor speed with a predetermined reference speed to determine whether the vehicle is running at low or high speed and compare the pressure applied to the accelerator pedal with a predetermined reference pressure to determine whether the pressure applied to the accelerator pedal is greater than or equal to the predetermined reference pressure, and a control unit configured to control a change in the number of coil-winding turns by changing a connection mode between the motor and an inverter according to a result of the determination of the determination unit.

12 Claims, 9 Drawing Sheets

FIG. 2

| ITEM | | UNIT | SERIAL MODE | PARALLEL MODE |
|---|---|---|---|---|
| WINDING TYPE | | — | | |
| HIGH-SPEED COUNTER ELECTROMOTIVE VOLTAGE 600 VPK OR LESS | | Vpk | 631 | 315.5 |
| LINE COUNTER ELECTROMOTIVE FORCE | | Vrms | 45.0 | 22.5 |
| 1400rpm | TORQUE/POWER | Nm/kW | 205/30 | 109.2/16 |
| | EFFICIENCY | % | 79.8 | 80.6 |
| 4000rpm | TORQUE/POWER | Nm/kW | 71.7/30 | 71.7/30 |
| | EFFICIENCY | % | 92.5 | 92.7 |
| 6000rpm | TORQUE/POWER | Nm/kW | 47.8/30 | 47.8/30 |
| | EFFICIENCY | % | 90.9 | 93.5 |
| 8000rpm | TORQUE/POWER | Nm/kW | 35.9/30 | 35.9/30 |
| | EFFICIENCY | % | 88.6 | 91.8 |

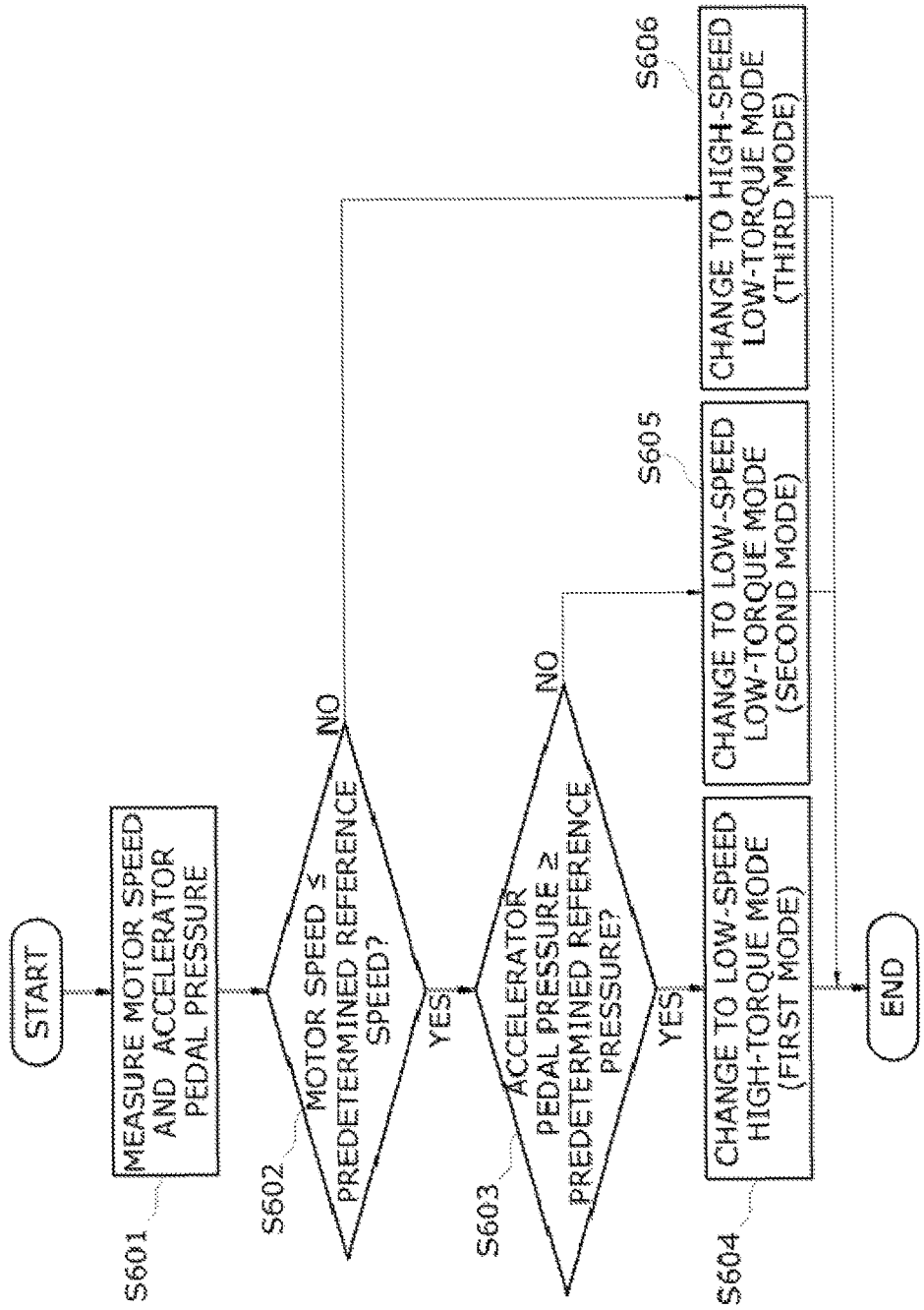

VEHICLE MOTOR CONTROL SYSTEM AND METHOD

CROSS-REFERENCE TO RELATED APPLICATION

This application claims priority from and the benefit of Korean Patent Application No. 10-2015-0166172, filed on Nov. 26, 2015, which is hereby incorporated by reference for all purposes as if fully set forth herein.

BACKGROUND

Field

Exemplary embodiments relate to a vehicle motor control system and method, and more particularly, to a vehicle motor control system and method that may change the number of turns in a coil of a motor according to the speed of the motor.

Discussion of the Background

An electric vehicle (EV), which is an example of an "eco-friendly vehicle" (Eco-Car), obtains a driving force through a vehicle motor that uses a vehicle battery as a power source. Due to the increase in weight and cost of the vehicle battery, a vehicle motor is designed and controlled such that it may be driven within a limited voltage range.

Due to an electric current limit, a vehicle motor needs high counter electromotive force to generate a maximum torque during low-speed running. To this end, a design for increasing the number of turns in a series coil of the motor is needed. Here, the counter electromotive force is expressed as the product of a magnetic flux linkage of a coil of a vehicle motor and a rotational speed of a rotor of the vehicle motor.

Since a counter electromotive force is proportional to a rotational speed of a rotor of a vehicle motor, a counter electromotive force of a vehicle motor designed to be efficient in a low-speed running range may exceed a vehicle battery voltage during a high-speed running range.

Therefore, in order to achieve optimization for high-speed running, the counter electromotive force should be generated to be less than the vehicle battery voltage limit. Thus, a design for decreasing the number of turns in a series coil of a motor is needed. However, when the number of turns of the motor is decreased and also when high torque is needed, high electric current should be input. Accordingly, a copper loss ($P=I^2r$) that is expressed by a winding resistance r and the square of a winding current I and a winding resistance r may increase, and efficiency may decrease.

Generally, once determined, a design for the number of turns of a coil of a vehicle motor cannot be changed while the vehicle motor is running. Thus, there are many difficulties involved in designing the number of turns of a vehicle motor such that performance required during low-speed running and performance required during high-speed running may be satisfied at the same time.

The above information disclosed in this Background section is only for enhancement of the understanding of the background of the invention and therefore it may contain information that does not constitute prior art.

SUMMARY

Exemplary embodiments of the present disclosure provides a vehicle motor control system and method that may change the number of winding turns of a coil wound around a stator according to a vehicle speed and a motor speed.

Additional features of the present invention will be set forth in the description which follows, and in part will be apparent from the description, or may be learned by practice of the invention.

An exemplary embodiment of the present disclosure discloses a vehicle motor control system including a measurement unit configured to measure a motor speed of a vehicle and a pressure applied to an accelerator pedal; a determination unit configured to compare the measured motor speed with a predetermined reference speed to determine whether the vehicle is running at low or high speed and compare the pressure applied to the accelerator pedal with a predetermined reference pressure to determine whether the pressure applied to the accelerator pedal is greater than or equal to the predetermined reference pressure; and a control unit configured to control a change in the number of coil-winding turns by changing a connection mode between the motor and an inverter according to a result of the determination of the determination unit.

An exemplary embodiment of the present disclosure also discloses a vehicle motor control method including measuring a motor speed of a vehicle and a pressure applied to an accelerator pedal; comparing the measured motor speed with a predetermined reference speed to determine whether the vehicle is running at low or high speed and comparing the pressure applied to the accelerator pedal with a predetermined reference pressure to determine whether the pressure applied to the accelerator pedal is greater than or equal to the predetermined reference pressure; and controlling the change in the number of coil-winding turns by changing the connection mode between the motor and an inverter according to a result of the determination of the determination unit.

The foregoing general description and the following detailed description are exemplary and explanatory and are intended to provide further explanation of the claimed subject matter.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 2 is a first reference view for describing a vehicle motor control system according to an exemplary embodiment of the present disclosure.

FIG. 6 is an operational flowchart showing a vehicle motor control method according to another exemplary embodiment of the present disclosure.

DETAILED DESCRIPTION OF THE ILLUSTRATED EMBODIMENTS

Figure 1:
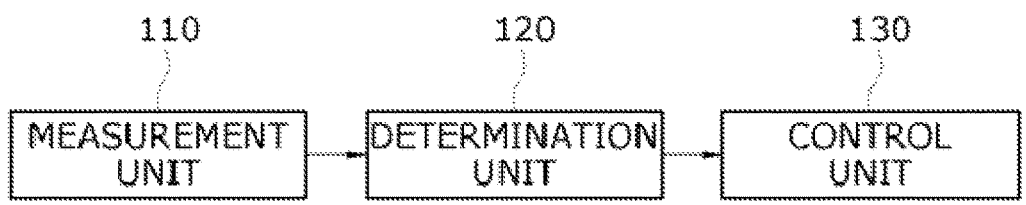
FIG. 1 is a block diagram showing a vehicle motor control system according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the drawings, the size and relative sizes of regions and components may be exaggerated for clarity. Like numerals denote like elements.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

Before describing the present disclosure, a vehicle battery and a vehicle motor that may be applied to the present disclosure will be briefly described below. This is intended to help the understanding of the present disclosure, and it should be understood that this is not used to limit the technical spirit of the present disclosure, unless specifically stated otherwise.

A vehicle battery is used as a power source of an electric vehicle (EV), a hybrid electric vehicle (HEV), a plug-in hybrid electric vehicle (PHEV), etc. which are representative eco-friendly vehicles (Eco-Cars).

A lithium polymer battery, which has high efficiency for its weight, is widely used as the vehicle battery. A high-voltage battery may be used as the vehicle battery in order to supply energy to a high-powered motor of an eco-friendly vehicle. The voltage of the high-powered motor may be in a range of about 180 V to about 280 V. In this case, the vehicle battery, which is a battery module assembly (BMA), may be in the form of a battery pack in which several batteries are connected in series.

An alternating current (AC) motor, which has high efficiency and is easy to control, may be commonly used in an eco-friendly vehicle.

A direct current (DC) motor has a relatively short maintenance period compared to other electric motors due to brush wear, and also is difficult to cool down due to internal heat generation resulting from an electric current flow into an internal rotor for operation.

On the other hand, an AC motor is relatively easy to cool down because an electric current is supplied to a coil in an external stator rather than an internal rotor, and can be precisely controlled by controlling the coil disposed in the stator.

When an AC motor is used, a vehicle motor control system has an inverter installed in a predetermined position to convert a vehicle battery, which is a DC power source, into an AC power source.

A vehicle motor control system according to an exemplary embodiment of the present disclosure will be described below in detail with reference to the accompanying drawings.

FIG. 1 is a block diagram of a vehicle motor control system according to an exemplary embodiment of the present disclosure.

As shown in FIG. 1, a vehicle motor control system 100 according to an exemplary embodiment of the present disclosure includes a measurement unit 110, a determination unit 120, and a control unit 130. In this case, the vehicle motor control system 100 according to an exemplary embodiment of the present disclosure may be implemented to include more elements than those shown above. The elements, each of which is an individual module or an integrated module, may be installed at a predetermined position inside the vehicle motor control system 100.

The measurement unit 110 measures the speed of a vehicle motor and an accelerator pedal pressure. Here, the vehicle motor speed is measured in revolutions per minute (rpm) at certain intervals. The vehicle motor control system 100 may include at least one or more rpm sensors and accelerator pedal sensors at certain positions in order to measure the motor speed and the accelerator pedal pressure.

The measurement unit 110 provides the measured motor speed and accelerator pedal pressure to the determination unit 120.

The determination unit 120 compares the motor speed provided from the measurement unit 110 with a predetermined reference speed to determine whether a vehicle is running at low or high speed. The reference speed that is used for the determination of the determination unit 120 will be described below with reference to FIGS. 2 and 3.

Figure 3:
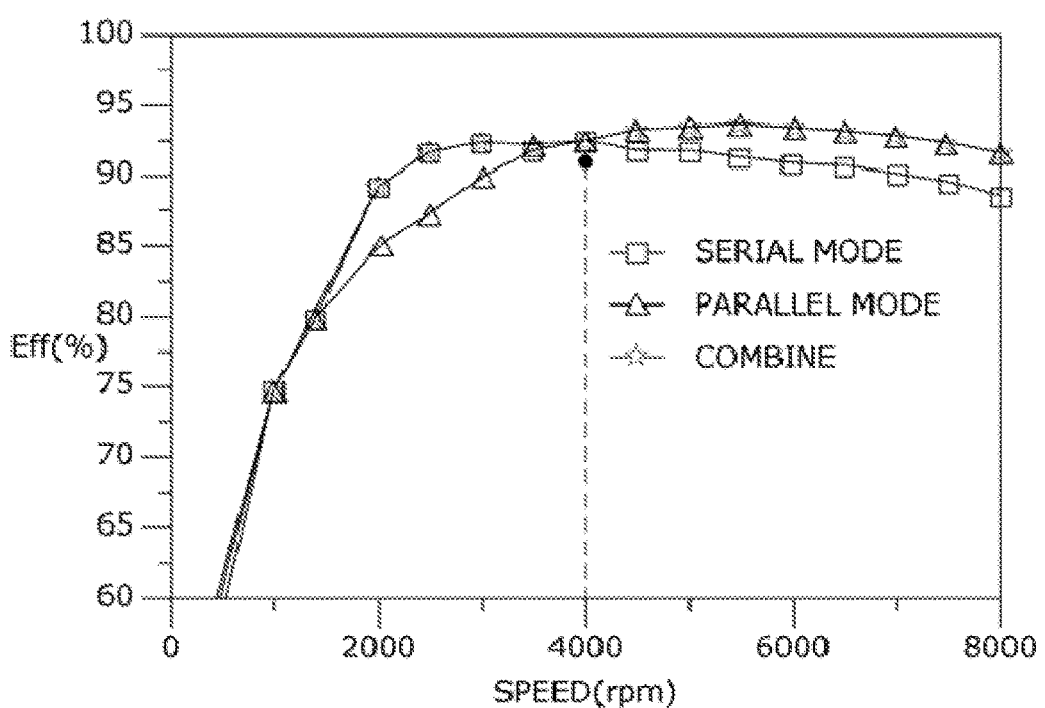
FIG. 3 is a second reference view for describing a vehicle motor control system according to an exemplary embodiment of the present disclosure.

FIG. 2 is a first reference view for describing a vehicle motor control system according to an exemplary embodiment of the present disclosure, and FIG. 3 is a second reference view for describing a vehicle motor control system according to an exemplary embodiment of the present disclosure.

As shown in FIG. 2, the vehicle motor has a different electrical specification for each speed section depending on the number of coil-winding turns in a coil connection form (series mode or parallel mode) between an inverter and a motor. Such data may be experimentally obtained in advance is a value previously input to the vehicle motor control system 100.

Here, torque/power in the series mode is 205 Nm/30 kW in a low-speed range including 1,400 rpm, and is about twice as great as torque/power in the parallel mode, which is 109.2 Nm/16 kW, and there is little or no difference in efficiency between the two modes.

In addition, the efficiency in the parallel mode begins to increase from a high-speed range of 4,000 rpm, compared to the series mode. On the other hand, there is little or no difference in torque/power between the two modes.

Accordingly, as shown in FIG. 3, the determination unit 120 may determine a low-speed range or a high-speed range on the basis of 4,000 rpm. That is, the determination unit 120 may determine the low-speed running range when the speed is less than 4,000 rpm, and may determine the high-speed running range when the speed is greater than or equal to 4,000 rpm. In this case, the reference speed may be set and changed according to specifications of the vehicle motor.

The control unit 130 may increase motor efficiency by changing the number of winding turns between an inverter and a motor to an efficient mode for each of the low-speed range and the high-speed range as determined by the determination unit 120. The change of the number of coil winding turns between an inverter and a motor will be described in detail in the description of the control unit 130.

When it is determined that a vehicle is running at low speed, the determination unit 120 compares the accelerator pedal pressure provided by the measurement unit 110 with a predetermined reference pressure to determine whether high pressure is applied to an accelerator pedal.

Here, a driver's intention for acceleration is reflected in the magnitude of the pressure applied to the accelerator pedal. Thus, in consideration of this, the control unit 130 may change the number of coil-winding turns between an inverter and a motor. In this case, the reference pressure may be set and changed by the vehicle manufacturer or a driver.

Through such a process, the determination unit 120 may determine whether a vehicle is running at low or high speed and the strength of the accelerator pedal pressure.

The control unit 130 performs control such that the number of coil-winding turns may be changed by changing a connection mode between the inverter and the motor depending on a result of the determination of the determination unit 120.

An operation of changing a connection mode between an inverter and a motor by the control unit 130 will be described below with reference to FIGS. 4 and 5.

Figure 4:
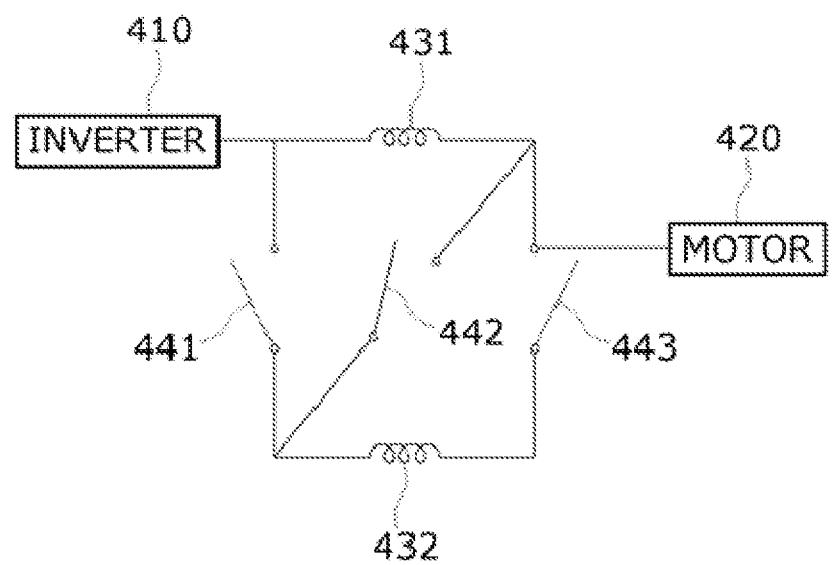
FIG. 4 is a first reference view for describing a change of a connection mode between an inverter and a motor by a controller according to an exemplary embodiment of the present disclosure.

FIG. 4 is a first reference view for describing a change of a connection mode between an inverter and a motor by a controller according to an exemplary embodiment of the present disclosure, and FIG. 5 is a second reference view for describing a change of a connection mode between an inverter and a motor by a controller according to an exemplary embodiment of the present disclosure.

As shown in FIG. 4, two windings, including a first winding 431 and a second winding 432, and three switches, including a switch S1 441, a switch S2 442, and a switch S3 443, are installed between an inverter 410 and a motor 420.

In detail, the first winding 431 and the second winding 432 are connected in parallel between the inverter 410 and the motor 420. Each of the first winding 431 and the second winding 432 is connected to the inverter 410 at one end and the motor 420 at the other end. The switch S1 441 is placed between the inverter 410 and the second winding 432 and configured to control the connection between the inverter 410 and the second winding 432. The switch S2 442 is placed between the first winding 431 and the second winding 432, and is configured to control the connection between the first winding 431 and the second winding 432. The switch S3 443 is placed between the second winding 432 and the motor 420, and is configured to control the connection between the switch S3 443 and the motor 420.

The control unit 130 may control on/off switching of the three switches S1 441, S2 442, and S3 443 to change a connection mode between the inverter 410 and the motor 420. The connection mode between the inverter 410 and the motor 420 may be one of a first mode to a third mode according to a connection state.

Figure 5A:
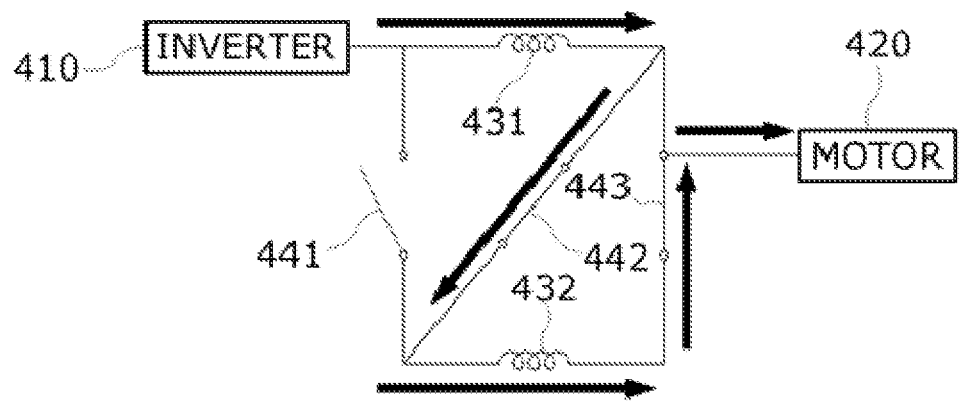
FIG. 5A, FIG. 5B, and FIG. 5C are second reference views for describing a change of a connection mode between an inverter and a motor by a controller according to an exemplary embodiment of the present disclosure.

For example, as shown in FIG. 5A, when the switch S1 441 is turned off, and the switch S2 442 is turned on, the first winding 431 and the second winding 432 are connected in series between the inverter 410 and the motor 420. In this case, a counter electromotive force may be represented as E, an inductance may be represented as L, a resistance may be represented as R, and an electric current density may be represented as A. A circuit with such a configuration is advantageous in generating high torque at low rpm, which is referred to as a first mode.

Figure 5B:
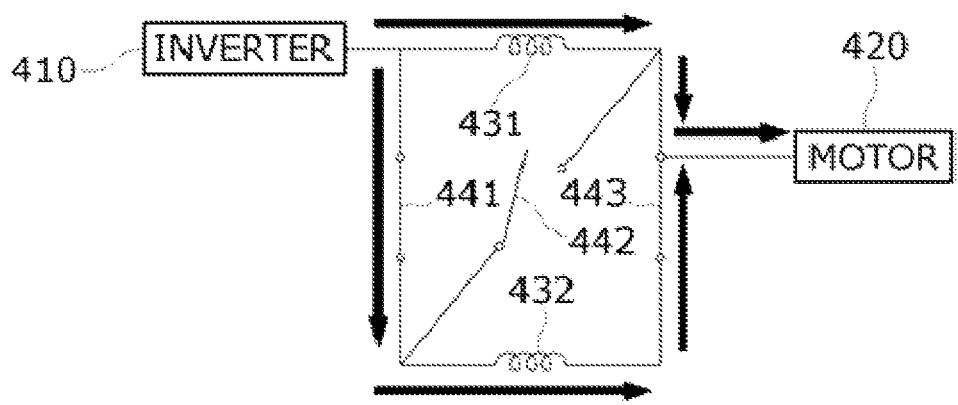

As shown in FIG. 5B, when the switch S1 441, the switch S2 442, and the switch S3 443 are all turned off, only a half of the total number of coil-winding turns between the inverter 410 and the motor 420, that is, the first winding 431 is connected. In this case, a counter electromotive force may be represented as E/2, an inductance may be represented as L/4, a resistance may be represented as R/2, and an electric current density may be represented as A. A circuit with such a configuration is advantageous in most situations in which high torque is not required at low rpm, which is referred to as a second mode.

Figure 5C:
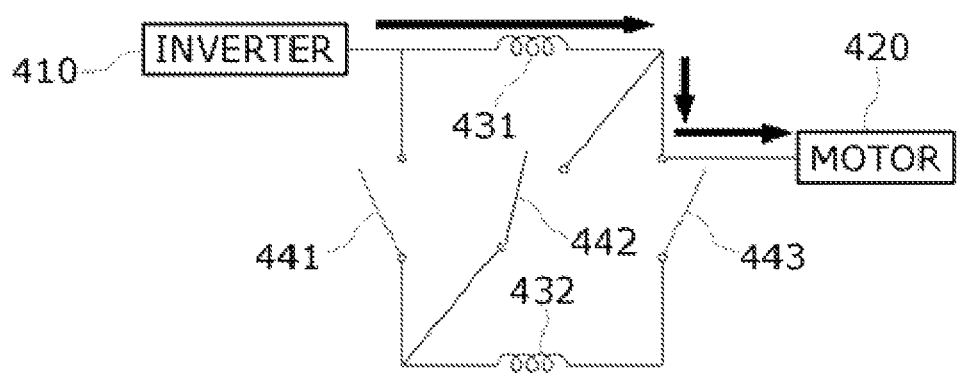

As shown in FIG. 5C, when the switch S1 441 and the switch S3 443 are turned on, and the switch S2 442 is turned off, the first winding 431 and the second winding 432 are connected in parallel between the inverter 410 and the motor 420. In this case, a counter electromotive force may be represented as E/2, an inductance may be represented as L/4, a resistance may be represented as R/2, and an electric current density may be represented as A/2. A circuit with such a configuration is advantageous in generating low torque at high rpm, which is referred to as a third mode.

The control unit 130 may change the connection mode between the inverter 410 and the motor 420 from the first mode to the third mode according to a result of the determination of the determination unit 120.

As an example, when it is determined by the determination unit 120 that the vehicle is running at low speed and the accelerator pedal pressure is high, the control unit 130 turns off the switch S1 441 and turns on the switch S2 442 and the switch S3 443 to change the connection mode to the first mode (the low-speed high-torque mode).

As another example, when it is determined by the determination unit 120 that the vehicle is running at low speed and the accelerator pedal pressure is low, the control unit 130 turns off all of the switch S1 441, the switch S2 442, and the switch S3 443 to change the connection mode to the second mode.

As still another example, when it is determined by the determination unit 120 that the vehicle is running at high speed and the accelerator pedal pressure is low, the control unit 130 turns on the switch S1 441, turns off the switch S2 442, and turns on the switch S3 443 to change the connection mode to the third mode (the high-speed low-torque mode).

The third mode is designed to achieve optimal efficiency when low torque is generated during high-speed running. However, high torque may be required during high-speed running according to a driver's need. Accordingly, when it is determined by the determination unit 120 that the vehicle is running at high speed and the accelerator pedal pressure is high, the control unit 130 may output high torque by turning off the switch S1 441 and turning on the switch S2 442 and the switch S3 443 to change the connection mode between the inverter 410 and the motor 420 from the third mode to the first mode. In this case, the accelerator pedal pressure is determined by performing comparison to a predetermined reference pressure, and the predetermined reference pressure may be set equal to the value used for the determination in the above-described first and second modes.

However, since the first mode is designed to generate high torque during low-speed running, a counter electromotive force may exceed a battery voltage during high-speed running. Accordingly, the control unit 130 may preset a predetermined stable voltage (e.g., 80% of the battery voltage) and may restrict the counter electromotive force of the motor to less than the predetermined stable voltage.

For example, the control unit 130 may check whether the counter electromotive force operates within the predetermined stable voltage in the first mode and may maintain the first mode according the accelerator pedal pressure when it is determined that the counter electromotive force operates below the predetermined stable voltage.

On the other hand, when it is determined that the counter electromotive force is greater than or equal to the predetermined stable voltage in the first mode, the control unit 130 may decrease the torque and also the counter electromotive force by turning on the switch S1 441 and the switch S3 443 and turning off the switch S2 442 to change the connection mode to the third mode.

A vehicle motor control method according to an exemplary embodiment of the present disclosure and the corresponding operation of the vehicle motor control system according to an exemplary embodiment of the present disclosure will be described step by step with reference to FIGS. 6 and 7.

FIG. 6 is a flowchart showing a vehicle motor control method according to another embodiment of the present disclosure. It is assumed that the following operations are performed by the vehicle motor control system 100 unless specially stated otherwise.

The vehicle motor control system 100 measures the speed of a vehicle motor and a pressure applied to an accelerator pedal by a driver (hereinafter referred to as an accelerator pedal pressure) (S601). Here, the motor speed is measured in revolutions per minute (rpm) at certain intervals. The vehicle motor control system 100 may include at least one or more rpm sensors and accelerator pedal sensors at certain positions in order to measure the motor speed and the accelerator pedal pressure.

The vehicle motor control system 100 compares the motor speed measured in S601 with a predetermined reference speed to determine whether a vehicle is running at low or high speed (S602).

As shown in FIG. 2, the vehicle motor has a different electrical specification for each speed range depending on the number of coil-winding turns in a coil connection form (series mode or parallel mode) between an inverter and a motor. Such data may be obtained in advance through an experiment and is a value previously input to the vehicle motor control system 100.

Here, it can be seen that torque/power in the series mode is 205 Nm/30 kW in a low-speed range including 1,400 rpm and is about twice as great as torque/power in the parallel mode, which is 109.2 Nm/16 kW, but there is little or no difference in efficiency between the two modes.

In addition, it can be seen that the efficiency in the parallel mode starts to increase from a high-speed range of 4,000 rpm compared to the series mode, but there is no difference in torque/power between the two modes.

Accordingly, as shown in FIG. 3, the vehicle motor control system 100 may determine a low-speed range or a high-speed range on the basis of 4,000 rpm. That is, the vehicle motor control system 100 may determine the low-speed running range when the speed is less than 4,000 rpm and may determine the high-speed running range when the speed is greater than or equal to 4,000 rpm. In this case, the reference speed may be set and changed according to specifications of the vehicle motor.

The vehicle motor control system 100 may increase motor efficiency by changing the number of winding turns between an inverter and a motor to an efficient mode for the determined speed range.

When it is determined in S602 that a vehicle is running at low speed, the vehicle motor control system 100 compares the accelerator pedal pressure measured in S601 with a predetermined reference pressure to determine whether high pressure is applied to an accelerator pedal (S603).

Here, a driver's intention for acceleration is reflected in the magnitude of the pressure applied to the accelerator pedal. Thus, in consideration of this, the vehicle motor control system 100 may change the number of coil-winding turns between an inverter and a motor. In this case, the reference pressure may be set and changed according to the vehicle manufacturer or a driver. For example, the vehicle motor control system 100 performs control such that the number of coil-winding turns may be changed by changing a connection mode between the inverter and the motor depending on results of the determinations in S602 and S603. In this case, as shown in FIG. 4, the connection mode between the inverter and the motor may be changed by controlling on/off switching of a switch that connects a first winding and a second winding placed between the inverter 410 and the motor 420.

In detail, as shown in FIG. 4, two coils, including the first winding 431 and the second winding 432, and three switches, including the switch S1 441, the switch S2 442, and the switch S3 443, are installed between the inverter 410 and the motor 420.

In further detail, the first winding 431 and the second winding 432 are placed in parallel between the inverter 410 and the motor 420. The first winding 431 and the second winding 432 are connected to the inverter 410 at one ends and the motor 420 at the other ends. The switch S1 441 is placed between the inverter 410 and the second winding 432 and configured to control connection between the inverter 410 and the second winding 432. The switch S2 442 is placed between the first winding 431 and the second winding 432 and configured to control connection between the first winding 431 and the second winding 432. The switch S3 443 is placed between the second winding 432 and the motor 420 and configured to control connection between the switch S3 443 and the motor 420.

The vehicle motor control system 100 may change the connection mode between the inverter 410 and the motor 420 by turning the switches on/off. The connection mode between the inverter 410 and the motor 420 may be one of a first mode to a third mode.

When it is determined in S602 and S603 that a vehicle is running at low speed and the accelerator pedal pressure is high, the vehicle motor control system 100 changes the connection mode to a low-speed high-torque mode (the first mode) (S604). For example, the vehicle motor control system 100 may turn off the switch S1 441 and turn on the switch S2 442 and the switch S3 443 to change the connection mode to the first mode.

As shown in FIG. 5A, when the vehicle motor control system 100 turns off the switch S1 441 and turns on the switch S2 442 and the switch S3 443, the first winding 431 and the second winding 432 are connected in series between the inverter 410 and the motor 420. In this case, a counter electromotive force may be represented as E, an inductance may be represented as L, a resistance may be represented as R, and an electric current density may be represented as A. A circuit with such a configuration is advantageous in generating high torque at low rpm.

As another example, when it is determined in S602 and S603 that a vehicle is running at low speed and the accelerator pedal pressure is low, the vehicle motor control system 100 changes the connection mode to a low-speed low-torque mode (the second mode) (S605). For example, the vehicle motor control system 100 may turn off all of the switch S1 441, the switch S2 442, and the switch S3 443 to change the connection mode to the second mode.

As shown in FIG. 5B, when the switch S1 441, the switch S2 442, and the switch S3 443 are all turned off, only a half of the total number of coil-winding turns between the inverter 410 and the motor 420, that is, the first winding 431 is connected. In this case, a counter electromotive force may be represented as E/2, an inductance may be represented as L/4, a resistance may be represented as R/2, and an electric current density may be represented as A. A circuit with such a configuration is advantageous in most situations in which high torque is not required at low rpm.

As still another example, when it is determined in S602 that the vehicle is running at high speed, the vehicle motor control system 100 turns on the switch S1 441, turns off the switch S2 442, and turns on the switch S3 443 to change the connection mode to a high-speed low-torque mode (the third mode) (S606).

As shown in FIG. 5C, when the vehicle motor control system 100 turns on the switch S1 441, turns off the switch S2 442, and turns on the switch S3 443, the first winding 431 and the second winding 432 are connected in parallel between the inverter 410 and the motor 420. In this case, a counter electromotive force may be represented as E/2, an inductance may be represented as L/4, a resistance may be represented as R/2, and an electric current density may be represented as A/2. A circuit with such a configuration is advantageous in generating high torque at low rpm.

The third mode is designed to achieve optimal efficiency when low torque is generated during high-speed running. However, high torque may be required during high-speed running according to a driver's need. Thus, when it is determined that the vehicle is running at high speed and the accelerator pedal pressure is high, the vehicle motor control system 100 may generate high torque by changing the connection mode between the inverter 410 and the motor 420 to the first mode. In this case, the accelerator pedal pressure is determined by performing comparison to a predetermined reference pressure, and the predetermined reference pressure may be set equal to the value used for the determination in the above-described first and second modes.

Since the first mode is designed to generate high torque during low-speed running, a counter electromotive force may exceed a battery voltage during high-speed running. Accordingly, the vehicle motor control system 100 may preset a predetermined stable voltage (e.g., 80% of the battery voltage) and may restrict the counter electromotive force of the motor 420 to less than the predetermined stable voltage.

A vehicle motor control method for a case in which high torque is required by a driver's need during high-speed running will be described below in detail with reference to FIG. 7.

Figure 7:
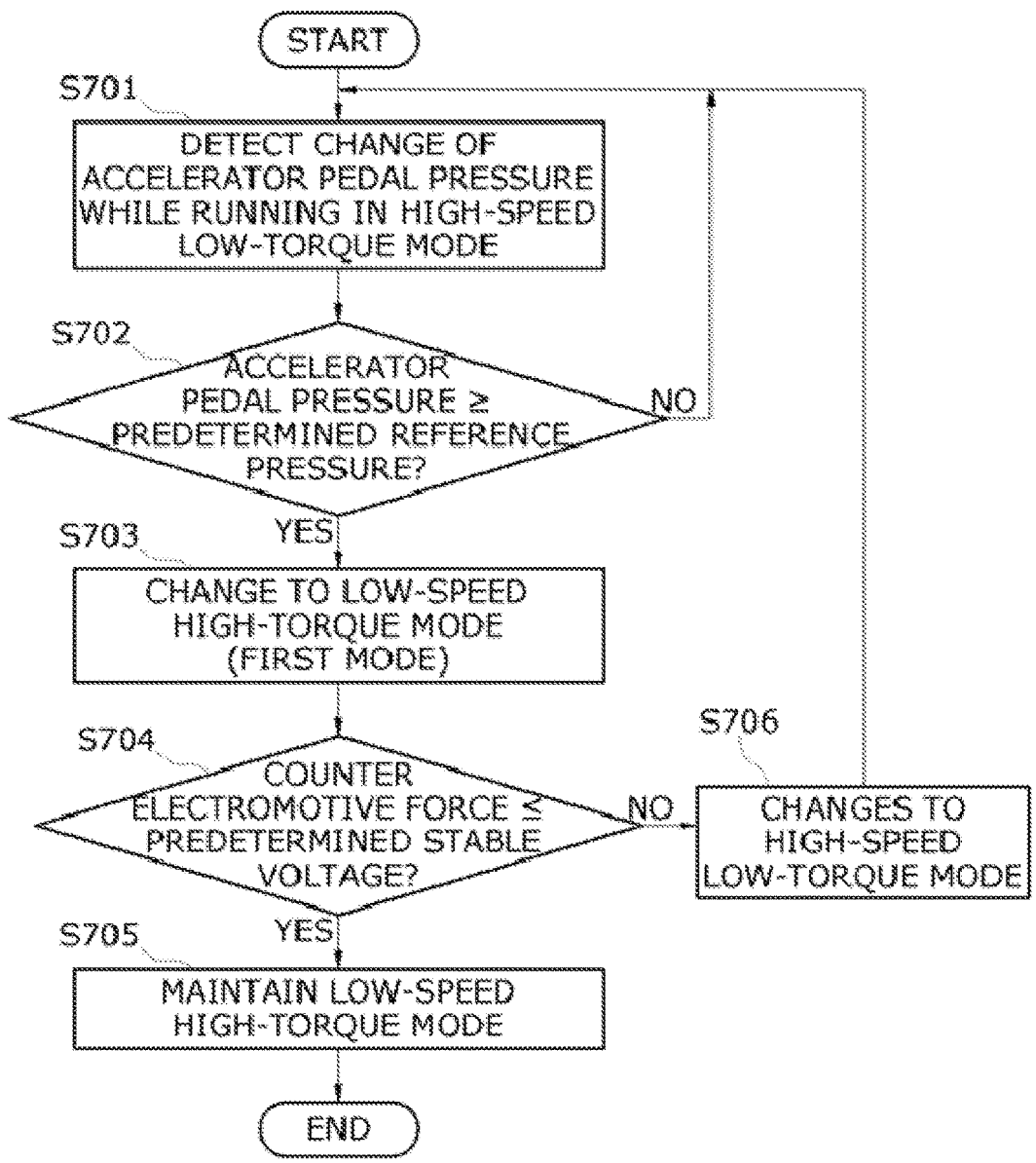
FIG. 7 is an operational flowchart showing a vehicle motor control method for a case in which high torque is required during high-speed running according to another exemplary embodiment of the present disclosure.

FIG. 7 is a flowchart showing a vehicle motor control method for a case in which high torque is required during high-speed running according to another embodiment of the present disclosure.

The following process will be operated after S606.

When the vehicle is running in the third mode, the vehicle motor control system 100 may detect an increase in the accelerator pedal pressure according to a driver's intention for acceleration (S701).

The vehicle motor control system 100 determines whether the accelerator pedal pressure determined in S701 is greater than or equal to a predetermined pressure (S702).

When it is determined in S702 that the accelerator pedal pressure is greater than or equal to the predetermined reference pressure, as shown in FIG. 5A, the vehicle motor control system 100 turns off the switch S1 441 and turns on the switch S2 442 and the switch S3 443 to change the connection mode to the first mode (S703).

Moreover, the vehicle motor control system 100 checks whether the counter electromotive force of the motor 420 operate within the predetermined stable voltage (S704) and may maintain the first mode according the accelerator pedal pressure when the counter electromotive force operates within the predetermined stable voltage (S705).

When it is determined in S704 that the counter electromotive force of the motor 420 operate over the predetermined stable voltage, the vehicle motor control system 100 turns on the switch S1 441, turns off the switch S2 442, and turns on the switch S3 443 to change the connection mode to the third mode (S706). Thus, the vehicle motor control system 100 may decrease the torque and also the counter electromotive force. After changing the connection mode between the inverter 410 and the motor 420 to the third mode, the vehicle motor control system 100 feeds back to S701 and then keeps running in the third mode.

According to the present disclosure, inverter efficiency is enhanced by increasing the number of coil series turns of a motor during low-speed running to decrease an input current at the same performance.

According to the present disclosure, inverter efficiency and motor efficiency are enhanced by increasing the number of parallel circuits during high-speed running to decrease a field-weakening control current.

According to the present disclosure, two or more motors may be controlled by one inverter.

The vehicle motor control system 100 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the vehicle motor control system 100 and/or one or more components thereof may include or otherwise be associated with one or more memories (not shown) including code (e.g., instructions) configured to cause the vehicle motor control system 100 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A vehicle motor control system comprising:
   a measurement unit configured to measure a motor speed of a vehicle and a pressure applied to an accelerator pedal;
   a determination unit configured to compare the measured motor speed with a predetermined reference speed to determine a first result of whether the vehicle is running at low or high speed and compare the pressure applied to the accelerator pedal with a predetermined reference pressure to determine a second result of whether the pressure applied to the accelerator pedal is greater than or equal to the predetermined reference pressure; and
   a control unit configured to control a change in the number of coil-winding turns by changing a connection mode between the motor and an inverter according to a combination of the first result and the second result of the determination of the determination unit.

2. The vehicle motor control system of claim 1, wherein, in a circuit between the inverter and the motor in which a first end of the first winding and a first end of the second winding are connected to the inverter,
   a second end of the first winding and a second end of the second winding are connected to the motor,
   a switch S1 is connected to the inverter and the first end of the second winding,
   a switch S2 is connected to the second end of the first winding and the first end of the second winding, and
   a switch S3 is connected to the second end of the second winding and the motor; wherein
   the control unit is configured to control a switching of the switches to change the connection mode between the inverter and the motor.

3. The vehicle motor control system of claim 2, wherein:
   the control unit is configured to turn off the switch S1 and turn on the switch S2 and the switch S3 to change the connection mode to a low-speed high-torque mode in which the first winding and the second winding are connected in series between the inverter and the motor when it is determined by the determination unit that the motor speed is less than the predetermined reference speed and the pressure applied to the accelerator pedal is greater than or equal to the predetermined reference pressure; and
   the control unit is configured to turn off all of the switch S1, the switch S2, and the switch S3 to change the connection mode to a low-speed low-torque mode in which a half of the total number of winding turns is connected between the inverter and the motor when it is determined by the determination unit that the motor speed is less than the predetermined reference speed and the pressure applied to the accelerator pedal is less than the predetermined reference pressure.

4. The vehicle motor control system of claim 2, wherein, the control unit is configured to turn on the switch S1, turn off the switch S2, and turn on the switch S3 to change the connection mode to a high-speed low-torque mode in which the first winding and the second winding are connected in parallel between the inverter and the motor when it is determined by the determination unit that the motor speed is greater than or equal to the predetermined reference speed.

5. The vehicle motor control system of claim 4, wherein, the control unit is configured to change the connection mode between the inverter and the motor to the low-speed high-torque mode when the vehicle is running in the high-speed low-torque mode and the pressure applied to the accelerator pedal is greater than or equal to the predetermined reference pressure.

6. The vehicle motor control system of claim 5, wherein, after changing the connection mode to the low-speed high-torque mode, the control unit is configured to compare a counter electromotive force of the motor with a predetermined stable voltage, maintain the low-speed high-torque mode when the counter electromotive force is less than the predetermined stable voltage, and change the connection mode between the inverter and the motor to the high-speed low-torque mode when the counter electromotive force is greater than or equal to the predetermined stable voltage.

7. A vehicle motor control method comprising:
measuring, with a measurement unit, a motor speed of a vehicle and a pressure applied to an accelerator pedal;
comparing, with a determination unit, the measured motor speed with a predetermined reference speed to determine a first result of whether the vehicle is running at low or high speed and comparing, with the determination unit, the pressure applied to the accelerator pedal with a predetermined reference pressure to determine a second result of whether the pressure applied to the accelerator pedal is greater than or equal to the predetermined reference pressure; and
controlling, with a control unit, a change in the number of coil-winding turns by changing a connection mode between the motor and an inverter according to a combination of the first result and the second result of the determination of the determination unit.

8. The vehicle motor control method of claim 7, wherein, in a circuit between the inverter and the motor in which a first end of the first winding and a first end of the second winding are connected to the inverter, the second end of the first winding and the second end of the second winding are connected to the motor, a switch S1 is connected to the inverter and the first end of the second winding, a switch S2 is connected to the second end of the first winding and the first end of the second winding, and a switch S3 is connected to the second end of the second winding and the motor; wherein the controlling comprises controlling a switching of the switches to change the connection mode between the inverter and the motor.

9. The vehicle motor control method of claim 8, wherein the controlling comprises:
changing the connection mode between the inverter and the motor to a low-speed high-torque mode when it is determined that the motor speed is less than the predetermined reference speed, and the pressure applied to the accelerator pedal is greater than or equal to the predetermined reference pressure; and
changing the connection mode between the inverter and the motor to a low-speed low-torque mode when it is determined that the motor speed is less than the predetermined reference speed, and the pressure applied to the accelerator pedal is less than the predetermined reference pressure.

10. The vehicle motor control method of claim 8, wherein the controlling further comprises, changing the connection mode between the inverter and the motor to a high-speed low-torque mode when the motor speed is greater than or equal to the predetermined reference speed.

11. The vehicle motor control method of claim 10, wherein the controlling further comprises, changing the connection mode between the inverter and the motor to the low-speed high-torque mode when the vehicle is running in the high-speed low-torque mode, and the pressure applied to the accelerator pedal is greater than or equal to the predetermined reference pressure.

12. The vehicle motor control method of claim 11, wherein the controlling further comprises:
comparing a counter electromotive force of the motor with a predetermined stable voltage after changing the connection mode to the low-speed high-torque mode;
maintaining the low-speed high-torque mode when the counter electromotive force is less than the predetermined stable voltage; and
changing the connection mode between the inverter and the motor to the high-speed low-torque mode when the counter electromotive force is greater than or equal to the predetermined stable voltage.

\* \* \* \* \*